United States Patent
Bian et al.

(10) Patent No.: US 11,415,821 B2
(45) Date of Patent: Aug. 16, 2022

(54) ELECTRO-OPTIC MODULATORS WITH STACKED LAYERS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 43 days.

(21) Appl. No.: 16/868,631

(22) Filed: May 7, 2020

(65) Prior Publication Data

US 2021/0109384 A1 Apr. 15, 2021

Related U.S. Application Data (62) Division of application No. 16/597,310, filed on Oct. 9, 2019, now Pat. No. 10,747,030.

(51) Int. Cl.
*G02F 1/025* (2006.01)
*G02F 1/035* (2006.01)

(52) U.S. Cl.
CPC ............ *G02F 1/025* (2013.01); *G02F 1/035* (2013.01); *G02F 2201/066* (2013.01); *G02F 2201/12* (2013.01); *G02F 2202/06* (2013.01); *G02F 2202/105* (2013.01)

(58) Field of Classification Search
None
See application file for complete search history.

(56) References Cited

U.S. PATENT DOCUMENTS

| | | | |
|---|---|---|---|
| 4,923,264 A | 5/1990 | Langer et al. | |
| 9,618,776 B2 | 4/2017 | Kim et al. | |
| 9,952,456 B2 | 4/2018 | Huang | |
| 10,649,245 B1* | 5/2020 | Bian | G02F 1/025 |
| 10,684,530 B1* | 6/2020 | Bian | G02F 1/29 |
| 10,747,030 B1* | 8/2020 | Bian | G02F 1/035 |
| 2013/0071058 A1 | 3/2013 | Lim et al. | |
| 2016/0109731 A1 | 4/2016 | Huang | |
| 2016/0291350 A1 | 10/2016 | Fujikata et al. | |
| 2016/0349546 A1 | 12/2016 | Abel et al. | |
| 2016/0349594 A1 | 12/2016 | Wurtz et al. | |
| 2018/0081204 A1 | 3/2018 | Ma et al. | |
| 2020/0057350 A1* | 2/2020 | Amin | G02F 1/025 |

OTHER PUBLICATIONS

Ma et al. ("Indium-Tin-Oxide for High-performance Electro-optic Modulation", Nanophotonics 2015; 4:198-213) (Year: 2015).*

(Continued)

*Primary Examiner* — Michelle R Connelly
(74) *Attorney, Agent, or Firm* — Thompson Hine LLP; Francois Pagette (57) ABSTRACT

Structures for an electro-optic modulator and methods of fabricating a structure for an electro-optic modulator. The electro-optic modulator has a layer stack arranged over a section of a waveguide core. The layer stack includes a first layer, a second layer, and a third layer. The first layer, the second layer, and the third layer are each composed of either copper or indium-tin oxide.

21 Claims, 6 Drawing Sheets

(56) References Cited

OTHER PUBLICATIONS

Yusheng Bian et al., "Electro-Optic Modulators With Stacked Metal, Dielectric, and Active Layers", U.S. Appl. No. 16/298,446, filed Mar. 11, 2019.
Yusheng Bian et al., "Electro-Optic Modulators With Layered Arrangements", U.S. Appl. No. 16/288,634, filed Feb. 28, 2019.
Laurent Gasca, "From O to L: The Future of Optical-Wavelength Bands", Broadband Properties, Jun. 2008, p. 83.
Bian et al., "Hybrid vanadate waveguiding configurations for extreme optical confinement and efficient polarization management in the near-infrared", Nanoscale, 2018,10, 16667-16674.
Alok P. Vasudev, Ju-Hyung Kang, Junghyun Park, Xiaoge Liu, and Mark L. Brongersma, "Electro-optical modulation of a silicon waveguide with an "epsilon-near-zero" material," Opt. Express 21, 26387-26397 (2013).
Melikyan, et al., "High-speed plasmonic phase modulators", Nature Photonics vol. 8, pp. 229-233 (2014).
Dionne et al., "PlasMOStor: A Metal-Oxide-Si Field Effect Plasmonic Modulator", Nano Lett. 2009, 9, 2, 897-902.
Krasavin et al., "Photonic Signal Processing on Electronic Scales: Electro-Optical Field-Effect Nanoplasmonic Modulator" Phys. Rev. Lett. 109, 053901—Published Jul. 31, 2012.
Lee et al., "Nanoscale Conducting Oxide PlasMOStor", Nano Lett. 2014, 14, 11 6463-6468.
Sorger et al., "Ultra-compact silicon nanophotonic modulator with broadband response", Nanophotonics, 1(1), pp. 17-22, Published Online: May 23, 2012.
Sorger et al., "Supplemental Data", Nanophotonics 1 (2012).
Bian et al., "Supplementary Information for Hybrid vanadate waveguiding configurations for extreme optical confinement and efficient polarization management in the near-infrared", © The Royal Society of Chemistry 2018.

* cited by examiner

ELECTRO-OPTIC MODULATORS WITH STACKED LAYERS

BACKGROUND

The present invention relates to photonics chips and, more specifically, to structures for an electro-optic modulator and methods of fabricating a structure for an electro-optic modulator.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

An electro-optic modulator used as an optical switch to selectively route an arriving optical signal from an input to a destination output without converting the optical signal to an electrical signal. For example, through the modulation, the selective routing can be utilized to convert a continuous optical signal into an encoded data stream. One type of optical switch is a Mach-Zehnder interferometer (MZI) modulator. A disadvantage of this type of switching is that MZI modulators exhibit a weak electro-optic effect and, for that reason, MZI modulators must have a large form factor that results in a large footprint on the photonics chip. During operation, MZI modulators also tend to consume large amounts of power. Hence, MZI modulators may adversely impact both the layout area and the operational overhead of a photonics chip.

Improved structures for an electro-optic modulator and methods of fabricating a structure for an electro-optic modulator are needed.

SUMMARY

In an embodiment of the invention, a structure includes a waveguide core and an electro-optic modulator positioned proximate to a section of the waveguide core. The electro-optic modulator includes an active layer and a confinement layer. The active layer is composed of a first material, and the confinement layer is composed of a second material with a different composition than the first material. The first material has a refractive index that is variable under an applied bias voltage. The second material has a permittivity with an imaginary part that ranges from 0 to about 15.

In an embodiment of the invention, a structure includes a waveguide core and an electro-optic modulator having a layer stack arranged over a section of the waveguide core. The layer stack includes a first layer, a second layer, and a third layer. The first layer, the second layer, and the third layer are each composed of copper or indium-tin oxide.

In an embodiment of the invention, a method includes forming a waveguide core, and forming an active layer and a confinement layer of an electro-optic modulator that is positioned proximate to a section of the waveguide core. The active layer is composed of a first material, and the confinement layer is composed of a second material with a different composition than the first material. The first material has a refractive index that is variable under an applied bias voltage, and the second material has a permittivity with an imaginary part that ranges from 0 to about 15.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
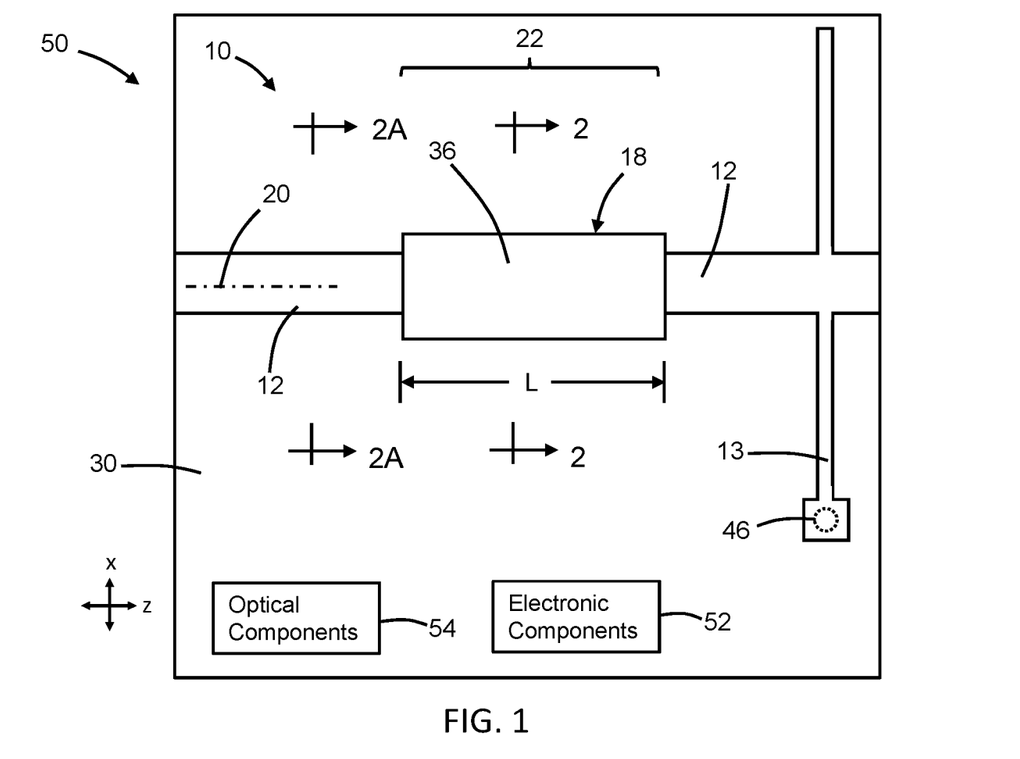
FIG. 1 is a diagrammatic top view of a photonics chip including a structure at an initial fabrication stage of a processing method in accordance with embodiments of the invention and in which some dielectric layers are omitted for clarity of description.
Figure 2:
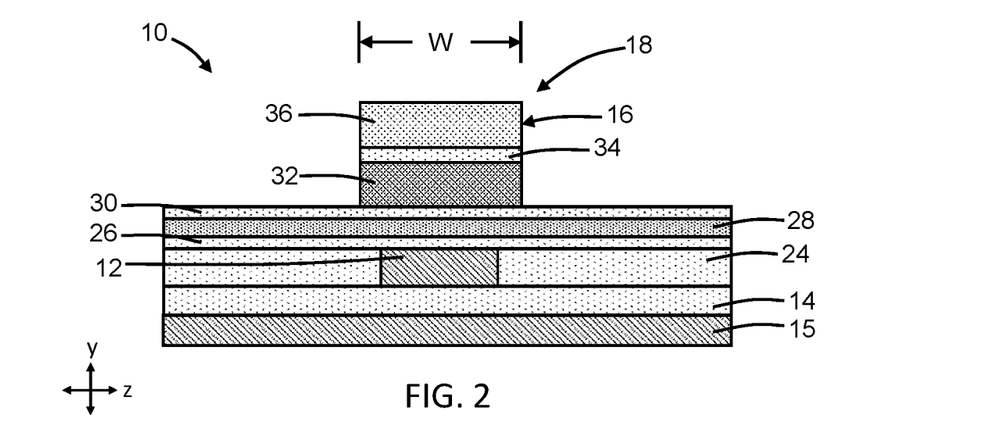
FIG. 2 is a cross-sectional view of the structure taken generally along line 2-2 in FIG.
Figure 2A:
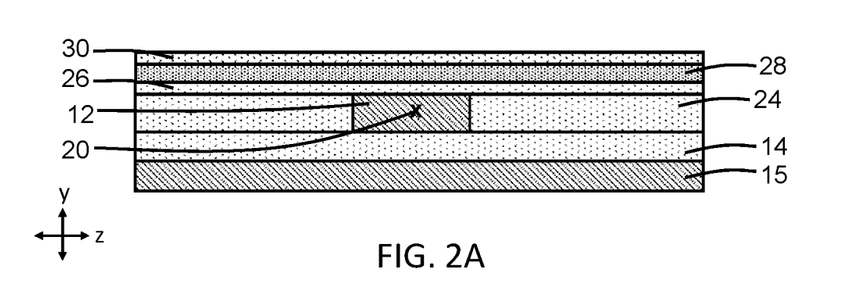
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12 arranged over a dielectric layer 14, and an electro-optic modulator 18 that includes a layer stack 16 arranged over the waveguide core 12. The waveguide core 12 may extend symmetrically along a longitudinal axis 20. In the representative embodiment, a section 22 of the waveguide core 12 is positioned in a vertical direction beneath the layer stack 16.

The waveguide core 12 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 14 and a substrate 15 composed of a single-crystal semiconductor material, such as single-crystal silicon, under the buried insulator layer. The waveguide core 12 may be patterned from the device layer of the silicon-on-insulator wafer by lithography and etching processes during front-end-of-line processing, and the device layer may be fully etched to define a rib waveguide as shown or, alternatively, only partially etched to define a ridge waveguide. The waveguide core 12 may have a constant width over the portion of its length associated with the structure 10.

Dielectric layers 24, 26, 28, 30 composed of respective dielectric materials are sequentially formed over the waveguide core 12. The waveguide core 12 is embedded or buried in the dielectric material of the dielectric layer 24. The dielectric layer 26 is arranged over the dielectric layer 24, the dielectric layer 28 is arranged over the dielectric layer 26, and the dielectric layer 30 is arranged over the dielectric layer 26. The dielectric layer 24 may be composed of a dielectric material, such as silicon dioxide, deposited by chemical vapor deposition and planarized with, for example, chemical mechanical polishing (CMP) to remove topography. The dielectric layer 26 may be composed of dielectric material, such as silicon dioxide, deposited by chemical vapor deposition or atomic layer deposition over the dielectric layer 24. The dielectric layer 28 may be composed of dielectric material, such as silicon nitride, deposited by chemical vapor deposition or atomic layer deposition over the dielectric layer 26. The dielectric layer 30 may be composed of dielectric material, such as silicon dioxide, deposited by chemical vapor deposition or atomic layer deposition over the dielectric layer 28. The dielectric layers 24, 26, 28, 30 are arranged in the vertical direction (i.e., the y-direction) between the waveguide core 12 and the electro-optic modulator 18 such that the waveguide core 12 and the electro-optic modulator 18 are separated and have a non-contacting relationship.

The layer stack 16 of the electro-optic modulator 18 is arranged over the dielectric layer 30, and the layer stack 16 is positioned proximate to the section 22 of the waveguide core 12. The proximity is such that the electro-optic modulator 18 can modulate an optical signal arriving in the waveguide core 12. The layer stack 16 laterally overlaps in the x-direction and in the z-direction with the section 22 of the waveguide core 12. The layer stack 16 may have a length, L, in a direction parallel to the longitudinal axis 20 (i.e., in the z-direction) that is equal to the length of the overlapped section 22 of the waveguide core 12. The layer stack 16 and the section 22 of the waveguide core 12 may have equal or substantially equal widths, W, in a direction (i.e., in the x-direction) transverse to the longitudinal axis 20. In an alternative embodiment, the layer stack 16 may include a taper at each end that functions to reduce the insertion loss.

The layer stack 16 of the electro-optic modulator 18 may include layers 32, 34, 36 that are arranged over the waveguide core 12. The layer 32 is arranged in the vertical direction between the layer 36 and the dielectric layer 30. The layer 34 is arranged in the vertical direction between the layer 32 and the layer 36. In an embodiment, the layer 34 is in direct contact with each of the layers 32, 36. The layers 32, 34, 36 may be formed by serially depositing layers of their respective materials to form the layer stack 16 and then patterning the deposited layers to define a footprint or shape (e.g., a length and a width) for the electro-optic modulator 18. The layers 32, 34, 36 may be deposited by atomic layer deposition, molecular beam epitaxy, or chemical vapor deposition, and may be patterned with lithography and etching processes. In an alternative embodiment, the widths and/or lengths of the individual layers 32, 34, 36 may differ through individual deposition and patterning. The layer 34 may be composed of dielectric material, such as silicon dioxide, that electrically isolates the layer 32 from the layer 36.

The layer 32 may be composed of a material that is electro-optically active. In an embodiment, the layer 32 may be composed of a material that is a conductor. In an embodiment, the layer 32 may be composed of indium-tin oxide (ITO). The material in the layer 32 may have a permittivity (i.e., dielectric constant) that may be changed or tuned based on a change in a bias voltage and associated electric field applied to the layer 32. The refractive index of the material contained in the layer 32 is related to the permittivity and, for that reason, the refractive index of the material contained in the layer 32 can also be changed or tuned based on a change in the applied bias voltage. The modulation of the refractive index effectively switches the electro-optic modulator 18 between different states for modulating optical signals of a given wavelength passing through the structure 10.

The layer 36 may be composed of a material with a different composition than the layer 32. In embodiments, the layer 36 may be composed of a material with a permittivity having a real part in a range of about −20 to about +20, and an imaginary part in a range of 0 to about 15. In an embodiment, the layer 36 may be composed of a material that is not electro-optically active such that the refractive index, which is related to permittivity, does not change with applied bias voltage. In an embodiment, the layer 36 may be composed of a material that is a conductor. In an embodiment, the layer 36 may be composed of a metal vanadate, such as calcium vanadate or strontium vanadate. The layer 36 operates as a confinement layer that may function to confine the optical signals within the electro-optic modulator 18.

The electro-optic modulator 18 may be useful for modulating an optical signal propagating with a given mode (e.g., TM mode) in the waveguide core 12. The layer 36 composed of a metal vanadate may enhance light confinement and may thereby improve the interactions of the optical signal with the layer 32 during modulation. Due to the confinement provided by the layer 36, the electro-optic modulator 18 may be reduced in size in comparison with, for example, a Mach-Zehnder interferometer modulator. The layer stack 16 is free of noble metals, such as gold or silver, and the formation of the layer stack 16 is fully compatible with complementary metal-oxide-semiconductor processes.

In an alternative embodiment that swaps the layering of the conductors in the layer stack 16, the layer 32 may be composed of a metal vanadate (e.g., calcium vanadate or strontium vanadate), and the layer 36 may be composed of indium-tin oxide.

Figure 3:
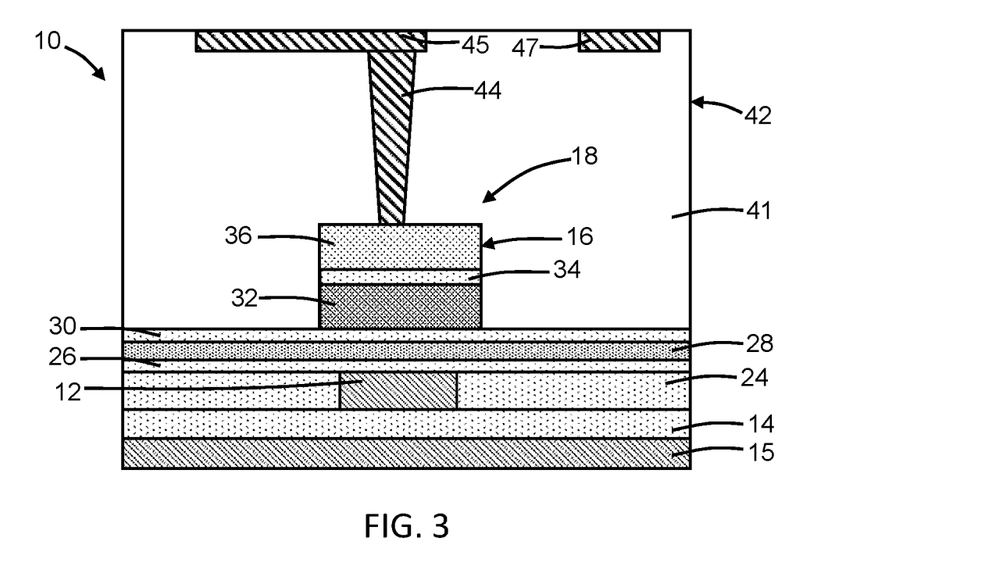
FIG. 3 is a cross-sectional view of the structure at a fabrication stage subsequent to FIG. 2.

With reference to FIG. 3 in which like reference numerals refer to like features in FIG. 2 and at a subsequent fabrication stage, a back-end-of-line stack, generally indicated by reference numeral 42, is formed by back-end-of-line (BEOL) processing over the electro-optic modulator 18. The back-end-of-line stack 42 may include one or more interlayer dielectric layers 41 composed of one or more dielectric materials, such as a carbon-doped silicon oxide, and metallization composed of, for example, copper, tungsten, and/or cobalt that is arranged in the one or more interlayer dielectric layers 41. In an embodiment, the electro-optic modulator 18 may be considered to be part of the back-end-of-line stack 42.

The metallization of the back-end-of-line stack 42 may include an interconnect in the form of a wire 45, a via 44 that connects the layer 36 with the wire 45, an interconnect in the form of a wire 47, and a via 46 (FIG. 1) that connects the waveguide core 12 with the wire 47. The via 46 may be connected to the wire 47 at a location removed from the proximity of the waveguide core 12 and, to that end, may be coupled by a strip 13 of single-crystal semiconductor material to the waveguide core 12. The vias 44, 46 may be located in respective etched via openings in the one or more interlayer dielectric layers 41. Through these connections, a switchable bias voltage may be applied from the wires 45, 47 in the back-end-of-line stack 42 to generate the electric field that can produce the change in the refractive index of the material contained in the layer 32.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

In use, phase matching between the waveguide core 12 and the electro-optic modulator 18 is leveraged to modulate the optical signal that is subsequently provided from the waveguide core 12 to the electro-optic modulator 18 and, after modulation, from the electro-optic modulator 18 back to the waveguide core 12. An optical signal propagating in a given direction (i.e., the z-direction) in the waveguide core 12 may enter the structure 10 at one end and may be shifted upwardly by the phase-matching between the waveguide core 12 and the electro-optic modulator 18. The electro-optic modulator 18 may be switched between 'ON' and 'OFF' conditions or states by selectively applying one or more bias voltages to the layer 32. In one state, the propagating optical signal is directed out of the plane of the electro-optic modulator 18 with a high coupling efficiency. For example, when a bias voltage is not applied (e.g., a bias voltage of 0 volts), the layer 32 may have a high refractive index providing low absorption and the electro-optic modulator 18 is thereby placed in an 'ON' state characterized by a high coupling efficiency. In another state, the propagating optical signal remains confined within the plane of the electro-optic modulator 18 with a low coupling efficiency. For example, when a bias voltage (e.g., a negative bias voltage) is applied, the layer 32 may have a low refractive index providing high absorption and the electro-optic modulator 18 is thereby placed in an 'OFF' state characterized by a low coupling efficiency. The modulated optical signal in the electro-optic modulator 18, when in its 'OFF' state, is shifted downwardly by the phase-matching between the electro-optic modulator 18 and the waveguide core 12, and the modulated optical signal may exit the structure 10 for further guiding by the waveguide core 12 to a destination on the photonics chip 50. Through the selective application of the bias voltage, an optical signal received at the entrance to the structure 10 can be modulated for output at the exit from the structure 10.

In an alternative embodiment, the waveguide core 12 may be composed of a dielectric material, such as silicon nitride, and may be positioned over the dielectric layer 30. The electro-optic modulator 18 is positioned over the waveguide core 12 as previously described.

Figure 4:
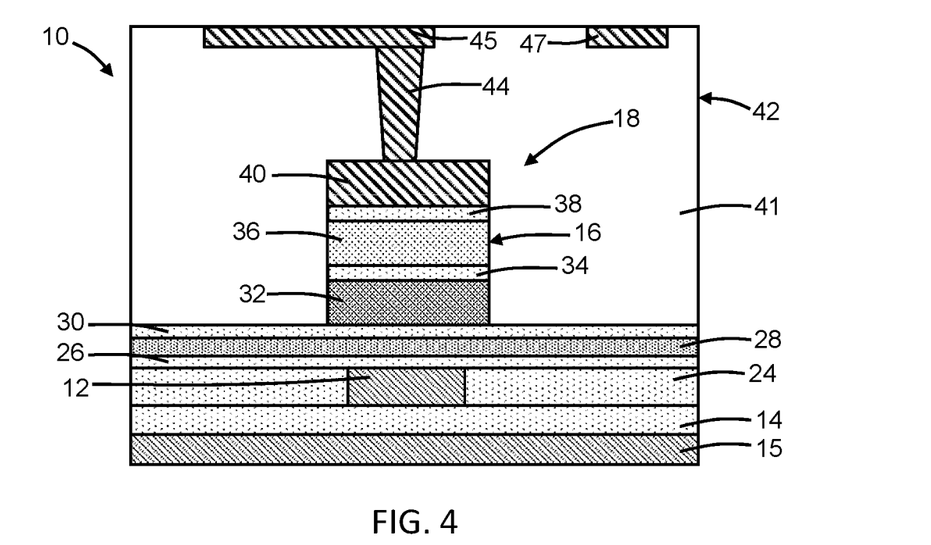
FIGS. 4-10 are cross-sectional views of structures in accordance with alternative embodiments of the invention.

With reference to FIG. 4 in which like reference numerals refer to like features in FIG. 3 and in accordance with alternative embodiments of the invention, layers 38, 40 may be added to the layer stack 16 of the electro-optic modulator 18. The layer 38 may be composed of a dielectric material, such as silicon dioxide, deposited by atomic layer deposition. The layer 38 is positioned between the layer 36 and the layer 40 and provides electrical isolation. The layer 40 may be coupled to the wire 45 by the via 44.

In an embodiment, the layer 40 may be composed of a metal, such as copper or titanium nitride, deposited by atomic layer deposition or chemical vapor deposition. In an embodiment, the layer 32 may be composed of a metal vanadate (e.g., calcium vanadate or strontium vanadate), the layer 36 may be composed of indium-tin oxide, and the layer 40 may be composed of the metal. In an alternative embodiment, the layer 32 may be composed of indium-tin oxide, the layer 36 may be composed of a metal vanadate, and the layer 40 may be composed of the metal.

In an alternative embodiment, the layer 32 may be composed of indium-tin oxide, the layer 36 may be composed of a metal, and the layer 40 may be composed of a metal vanadate. In an alternative embodiment, the layer 32 may be composed of a metal, the layer 36 may be composed of indium-tin oxide, and the layer 40 may be composed of a metal vanadate. In an alternative embodiment, the layer 32 may be composed of a metal, the layer 36 may be composed of a metal vanadate, and the layer 40 may be composed of indium-tin oxide. In an alternative embodiment, the layer 32 may be composed of a metal vanadate, the layer 36 may be composed of a metal, and the layer 40 may be composed of indium-tin oxide.

Figure 5:
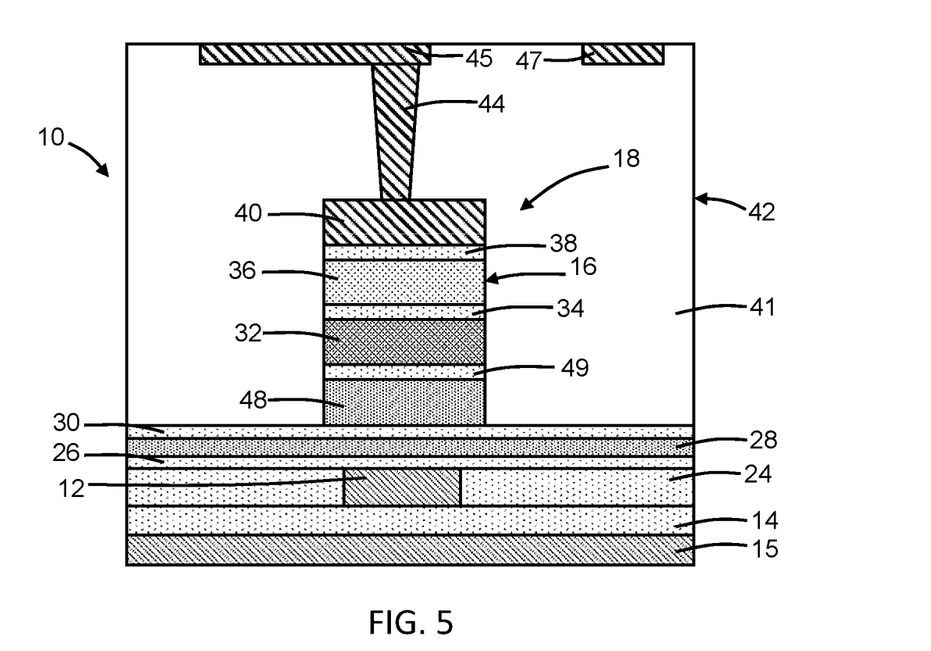

With reference to FIG. 5 in which like reference numerals refer to like features in FIG. 4 and in accordance with alternative embodiments of the invention, layers 48, 49 may be added to the layer stack 16 of the electro-optic modulator 18. The layer 48 is positioned in the vertical direction on the dielectric layer 30, and the layer 49 is positioned in the vertical direction between the layer 48 and the layer 32. The layer 49 may be composed of a dielectric material, such as silicon dioxide, deposited by atomic layer deposition. In an embodiment, the layer 48 may be composed of a dielectric material, such as silicon nitride, deposited by atomic layer deposition. The dielectric material of the layer 48 may be different in composition than the dielectric material of the layer 34. In an embodiment, the layer 48 may be composed of a dielectric material (e.g., silicon nitride), the layer 36 may be composed of a metal vanadate (e.g., calcium vanadate or strontium vanadate), the layer 38 may be composed of a metal (e.g., copper or titanium nitride), and the layer 40 may be composed of indium-tin oxide.

In an alternative embodiment, the layer 48 may be composed of a metal vanadate, the layer 32 may be composed of a dielectric material, the layer 36 may be composed of a metal, and the layer 40 may be composed of indium-tin oxide. In an alternative embodiment, the layer 48 may be composed of a dielectric material, the layer 32 may be composed of a metal vanadate, the layer 36 may be composed of indium-tin oxide, and the layer 40 may be composed of a metal. In an alternative embodiment, the layer 48 may be composed of a metal vanadate, the layer 32 may be composed of a dielectric material, the layer 36 may be composed of indium-tin oxide, and the layer 40 may be composed of a metal. In an alternative embodiment, the layer 48 may be composed of a dielectric material, the layer 32 may be composed of a metal vanadate, the layer 36 may be composed of a metal, and the layer 40 may be composed of indium-tin oxide. In an alternative embodiment, the layer 48 may be composed of a metal vanadate, the layer 32 may be composed of a metal, the layer 36 may be composed of a dielectric material, and the layer 40 may be composed of indium-tin oxide. In an alternative embodiment, the layer 48 may be composed of a metal vanadate, the layer 32 may be composed of indium-tin oxide, the layer 36 may be composed of a dielectric material, and the layer 40 may be composed of a metal. In an alternative embodiment, the layer 48 may be composed of indium-tin oxide, the layer 32 may be composed of a metal vanadate, the layer 36 may be composed of a dielectric material, and the layer 40 may be composed of a metal.

In an alternative embodiment, the layer 48 may be composed of indium-tin oxide, the layer 32 may be composed of a dielectric material, the layer 36 may be composed of a metal vanadate, and the layer 40 may be composed of a metal. In an alternative embodiment, the layer 48 may be composed of indium-tin oxide, the layer 32 may be composed of a dielectric material, the layer 36 may be composed of a metal, and the layer 40 may be composed of a metal vanadate. In an alternative embodiment, the layer 48 may be composed of indium-tin oxide, the layer 32 may be composed of a metal, the layer 36 may be composed of a dielectric material, and the layer 40 may be composed of a metal vanadate. In an alternative embodiment, the layer 48 may be composed of indium-tin oxide, the layer 32 may be composed of a dielectric material, the layer 36 may be composed of a metal vanadate, the layer 40 may be composed of a metal, and additional dielectric layers (e.g., a layer of silicon nitride over a layer of silicon dioxide) may be added between the layer 36 and the layer 40.

Figure 6:
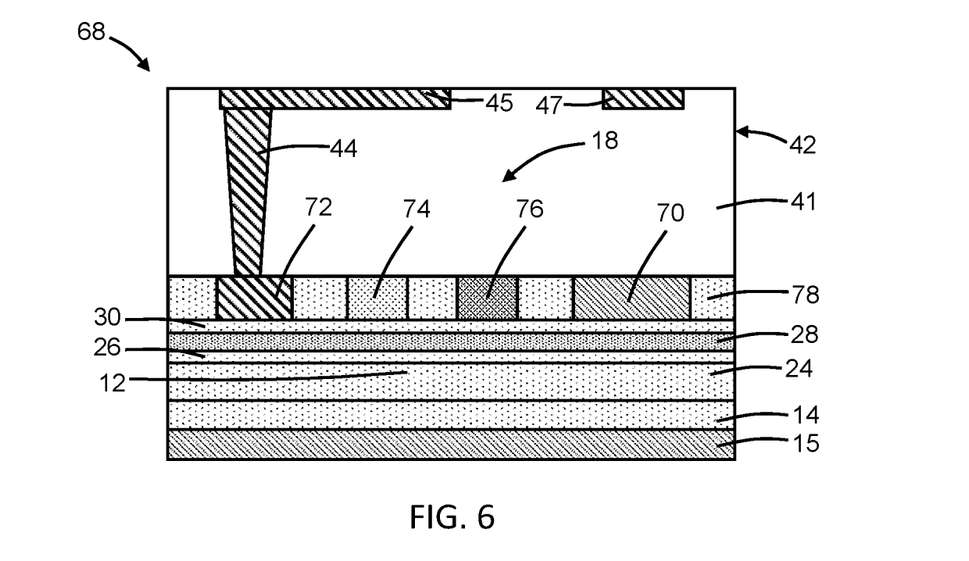

With reference to FIG. 6 in which like reference numerals refer to like features in FIG. 3 and in accordance with alternative embodiments of the invention, an electro-optic modulator 68 may be useful for modulating an optical signal propagating with a given mode (e.g., TE mode). The electro-optic modulator 68 may include a waveguide core 70 similar to waveguide core 12, as well as layers 72, 74, 76 positioned adjacent to a section of the waveguide core 70 with the layer 76 positioned closest to the waveguide core 70 and the layer 74 positioned between the layer 72 and the layer 76. The layer 72 may be connected to the wire 45 by the via 44, and the waveguide core 70 may be connected to the wire 47 by the via 46.

The waveguide core 70 and the layers 72, 74, 76 are embedded in a dielectric layer 78 that may be composed of a dielectric material, such as silicon dioxide. In an embodiment, the layer 72 may be composed of a metal (e.g., copper or titanium nitride), the layer 74 may be composed of indium-tin oxide, and the layer 76 may be composed of a metal vanadate (e.g., calcium vanadate or strontium vanadate). In an alternative embodiment, the layer 72 may be composed of a metal, the layer 74 may be composed of indium-tin oxide, and the layer 76 may be composed of a metal vanadate. The layers 72, 74, 76 may be formed by depositing respective material layers and patterning each material layer with lithography and etching processes.

The layer stack 16 may be considered to be an array or matrix of structures characterized by properties (e.g., refractive index) that differ from bulk properties, commonly referred to as a multiple-layer metamaterial. In alternative embodiments, other types of materials (e.g., graphene or an epsilon-near-zero material) may be substituted for the metal vanadate.

Figure 7:
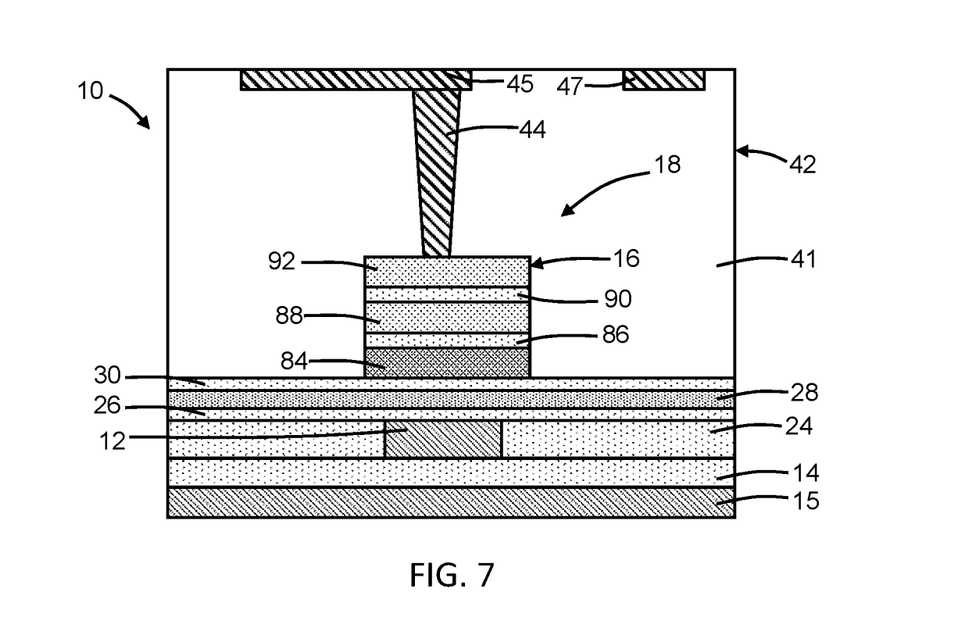

With reference to FIG. 7 in which like reference numerals refer to like features in FIG. 3 and in accordance with alternative embodiments of the invention, the layer stack 16 of the electro-optic modulator 18 may include layers 84, 86, 88, 90, 92 that are positioned in the layer stack 16 on the dielectric layer 30 and over the waveguide core 12. Alternating layers 86, 90 may be composed of dielectric material, such as silicon dioxide, deposited by atomic layer deposition. The layer 84 is positioned direction on the dielectric layer 30.

The layer 84 may be composed of indium-tin oxide, and the layers 88, 92 may be composed of a metal, such as copper, deposited by atomic layer deposition or chemical vapor deposition. In an alternative embodiment, the layers 84, 88 may be composed of indium-tin oxide, and the layer 92 may be composed of a metal. The layer 92 is positioned in a vertical direction over the layers 84, 88, and the layer 88 is positioned between the layer 84 and the layer 92.

Figure 8:
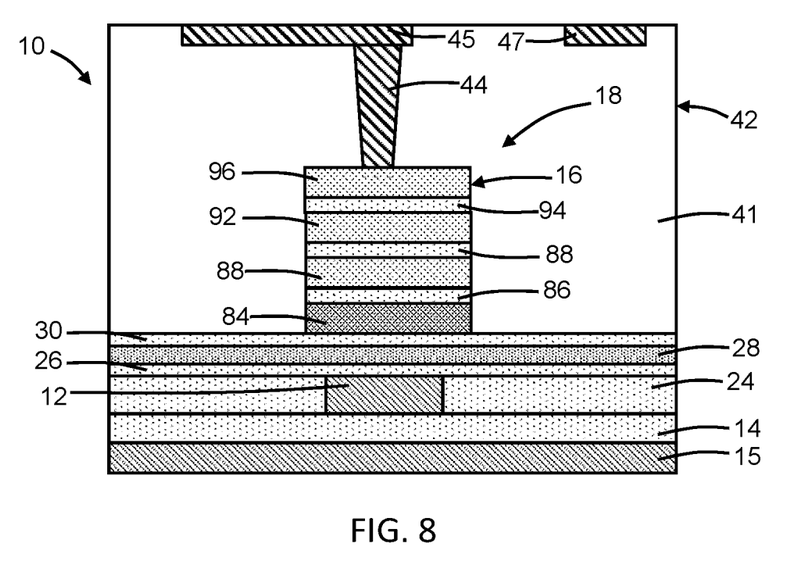

With reference to FIG. 8 in which like reference numerals refer to like features in FIG. 7 and in accordance with alternative embodiments of the invention, the layer stack 16 of the electro-optic modulator 18 may include additional layers 94, 96. The layer 94 is positioned between the layer 92 and the layer 96 and provides electrical isolation between the layers 92, 96. The layer 94 may be composed of a dielectric material, such as silicon dioxide, deposited by atomic layer deposition. In an embodiment, the layer 96 may be composed of a metal, such as copper, deposited by atomic layer deposition or chemical vapor deposition. The layers 92, 96 may be positioned in a vertical direction over the layers 84, 88.

In an embodiment, the layers 84, 88 may be composed of indium-tin oxide, and the layers 92, 96 may be composed of a metal (e.g., copper). In an alternative embodiment, the layers 84, 92 may be composed of indium-tin oxide, and the layers 88, 96 may be composed of a metal such that the composition of the layers 84, 88, 92, 96 alternates in a vertical direction.

Figure 9:
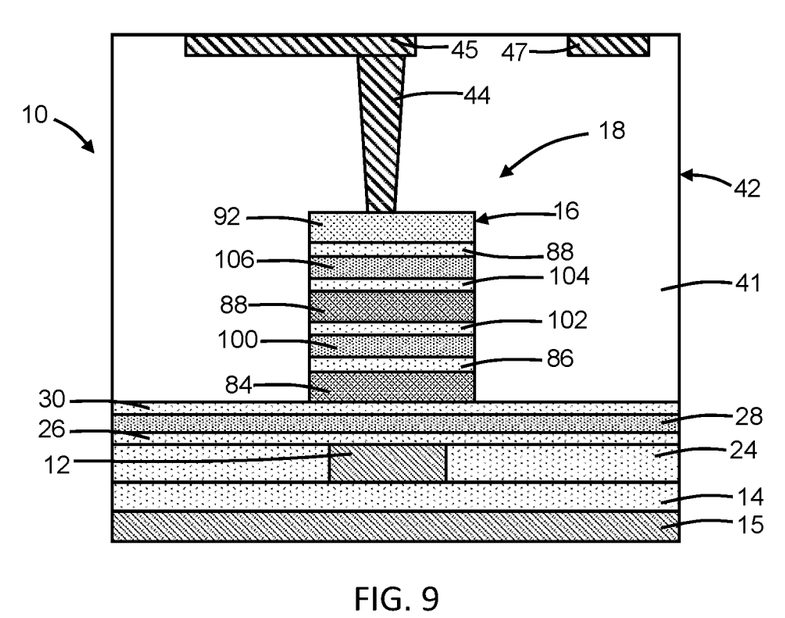

With reference to FIG. 9 in which like reference numerals refer to like features in FIG. 6 and in accordance with alternative embodiments of the invention, the layer stack 16 of the electro-optic modulator 18 may include an additional pair of dielectric layers 100, 102 and an additional pair of dielectric layers 104, 106. The layer 88 is positioned between the pair of dielectric layers 100, 102 and the pair of dielectric layers 104, 106. The layer 102 is positioned in the layer stack 16 between the layer 100 and the layer 88, and the layer 104 is positioned in the layer stack 16 between the layer 106 and the layer 88. The dielectric layers 102, 104 may be composed of dielectric material, such as silicon dioxide, deposited by chemical vapor deposition or atomic layer deposition. The dielectric layers 100, 106 may be composed of dielectric material, such as silicon nitride, deposited by chemical vapor deposition or atomic layer deposition.

Figure 10:
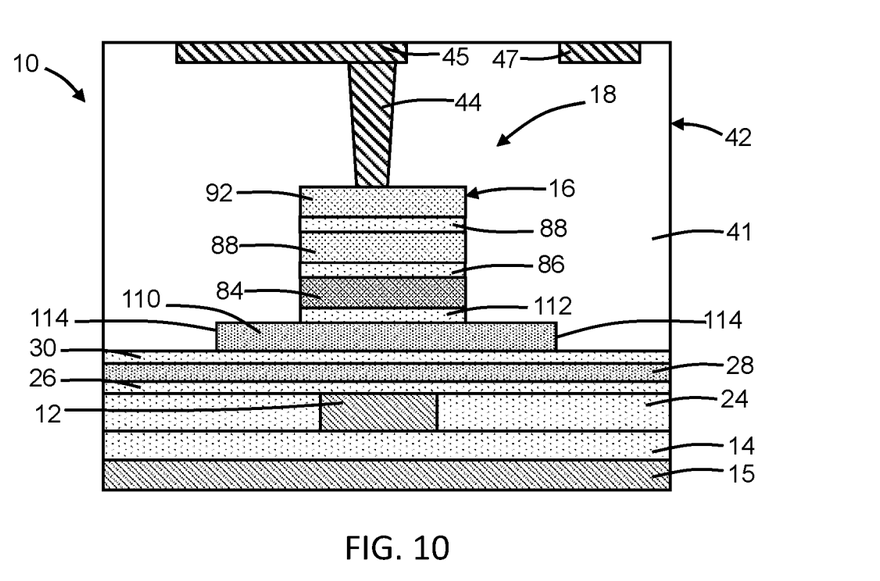

With reference to FIG. 10 in which like reference numerals refer to like features in FIG. 6 and in accordance with alternative embodiments of the invention, a waveguide core 110 may be positioned between the dielectric layer 30 and the bottom layer 82 of the layer stack 16. A dielectric layer 112 may be located between the waveguide core 110 and the layer 84. The dielectric layer 112 may be composed of dielectric material, such as silicon dioxide, deposited by chemical vapor deposition or atomic layer deposition.

The waveguide core 110 may be longer than the layer stack 16, and therefore be positioned over a longer section of the waveguide core 12 than the section 22 (FIG. 1) of the waveguide core 12. The waveguide core 110 is terminated at opposite ends 114 to provide a definite length. The opposite ends 114 may protrude outwardly from beneath the layer stack 16. The waveguide core 12 may have a longitudinal axis that is aligned parallel or substantially parallel with the longitudinal axis 20 of the waveguide core 12.

The waveguide core 110 may be patterned from a layer of dielectric material (e.g., silicon nitride) by lithography and etching processes, and the dielectric layer may be fully etched to define a rib waveguide or, alternatively, only partially etched to define a ridge waveguide. The waveguide core 110 may include tapers at the opposite ends 114. In alternative embodiments, the waveguide core 110 may also be combined with the electro-optic modulator 18 of FIG. 7 or the electro-optic modulator 18 of FIG. 8.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core; and
an electro-optic modulator including a layer stack arranged over a section of the first waveguide core, the layer stack including a first layer, a second layer, a third layer, a fourth layer positioned between the first layer and the second layer, and a fifth layer positioned between the second layer and the third layer, the first layer, the second layer, and the third layer each comprised of a metal or indium-tin oxide, and the fourth layer and the fifth layer each comprised of a dielectric material.

2. The structure of claim 1 wherein the second layer and the third layer are comprised of the metal, and the first layer is comprised of indium-tin oxide.

3. The structure of claim 2 wherein the second layer is positioned between the third layer and the first layer, and the first layer is positioned between the second layer and the section of the first waveguide core.

4. The structure of claim 1 wherein the first layer and the second layer are comprised of indium-tin oxide, and the third layer is comprised of the metal.

5. The structure of claim 4 wherein the second layer is positioned between the third layer and the first layer, and the first layer is positioned between the second layer and the section of the first waveguide core.

6. The structure of claim 1 wherein the metal is copper.

7. The structure of claim 1 further comprising:
a second waveguide core positioned between the layer stack and the section of the first waveguide core.

8. The structure of claim 7 wherein the second waveguide core has a first end and a second end opposite to the first end, and the first end and the second end of the second waveguide core each protrude outwardly from beneath the layer stack.

9. The structure of claim 8 wherein the first waveguide core has a first longitudinal axis, and the second waveguide core has a second longitudinal axis that is aligned substantially parallel with the first longitudinal axis.

10. The structure of claim 7 wherein the first waveguide core is comprised of single-crystal silicon, and the second waveguide core is comprised of silicon nitride.

11. The structure of claim 1 wherein the dielectric material is silicon dioxide.

12. The structure of claim 1 wherein the layer stack includes a sixth layer comprised of the metal or indium-tin oxide.

13. The structure of claim 12 wherein the first layer and the second layer are comprised of indium-tin oxide, and the third layer and the sixth layer are comprised of the metal.

14. The structure of claim 13 wherein the second layer is positioned between the first layer and the third layer, and the third layer is positioned between the second layer and the sixth layer.

15. The structure of claim 13 wherein the third layer is positioned between the first layer and the second layer, and the second layer is positioned between the third layer and the sixth layer.

16. The structure of claim 1 further comprising:
a sixth layer positioned between the first layer and the second layer,
wherein the sixth layer is comprised of silicon nitride.

17. A method comprising:
forming a waveguide core; and
forming an electro-optic modulator including a layer stack over a section of the waveguide core,
wherein the layer stack includes a first layer, a second layer, a third layer, a fourth layer positioned between the first layer and the second layer, and a fifth layer positioned between the second layer and the third layer, the first layer, the second layer, and the third layer are each comprised of a metal or indium-tin oxide, and the fourth layer and the fifth layer are each comprised of a dielectric material.

18. The method of claim 17 wherein the second layer and the third layer are comprised of the metal, the first layer is comprised of indium-tin oxide, the second layer is positioned between the third layer and the first layer, and the first layer is positioned between the second layer and the section of the waveguide core.

19. The method of claim 17 wherein the first layer and the second layer are comprised of indium-tin oxide, the third layer is comprised of the metal, the second layer is positioned between the third layer and the first layer, and the first layer is positioned between the second layer and the section of the waveguide core.

20. The method of claim 17 wherein the metal is copper.

21. The method of claim 17 wherein the dielectric material is silicon dioxide.

* * * * *